US012586511B2

(12) United States Patent
Chang et al.

(10) Patent No.: US 12,586,511 B2
(45) Date of Patent: Mar. 24, 2026

(54) ADJUSTING SYSTEM FOR ELECTRONIC CHART DISPLAY AND INFORMATION SYSTEM AND SETUP METHOD OF MONITOR

(71) Applicant: WINMATE INC., New Taipei City (TW)

(72) Inventors: Chun-Ruei Chang, New Taipei City (TW); Wen-Ju Tsai, New Taipei City (TW); Ling-Feng Wang, New Taipei City (TW); Chien-Ta Tang, New Taipei City (TW); Keng-Hung Huang, New Taipei City (TW)

(73) Assignee: WINMATE INC., New Taipei City (TW)

( * ) Notice: Subject to any disclaimer, the term of this patent is extended or adjusted under 35 U.S.C. 154(b) by 0 days.

(21) Appl. No.: 18/746,049

(22) Filed: Jun. 18, 2024

(65) Prior Publication Data

US 2025/0384812 A1 Dec. 18, 2025

(51) Int. Cl.
*G09G 3/20* (2006.01)

(52) U.S. Cl.
CPC ... *G09G 3/2096* (2013.01); *G09G 2320/0626* (2013.01); *G09G 2320/0666* (2013.01); *G09G 2320/0693* (2013.01); *G09G 2360/16* (2013.01)

(58) Field of Classification Search
CPC .................................................... G09G 3/2096
See application file for complete search history.

(56) References Cited

U.S. PATENT DOCUMENTS

2015/0100291 A1* 4/2015 Mrozowicz .............. G08G 3/02 703/6
2015/0176999 A1* 6/2015 Belot ..................... G01C 21/20 701/400
2021/0192176 A1* 6/2021 Galerne ................ H04W 84/18

* cited by examiner

*Primary Examiner* — Roy P Rabindranath
(74) *Attorney, Agent, or Firm* — JCIPRNET

(57) ABSTRACT

An adjusting system for Electronic Chart Display and Information System (ECDIS) and a setup method of monitor. The setup method is applied to a monitor of the ECDIS and includes the following. A testing mode is selected from a day mode, a dusk mode, and a night mode, and a color setting corresponding to the testing mode is obtained. The monitor is controlled to display a first color according to the color setting. A brightness difference between the first color displayed by the monitor and a target color is measured and calculated, and the color setting of the monitor is adjusted accordingly until the brightness difference meets a brightness difference condition. A contrast difference between the first color displayed by the monitor and the target color is measured and calculated, and the color setting of the monitor is adjusted accordingly until the contrast difference meets a contrast difference condition.

9 Claims, 2 Drawing Sheets

ADJUSTING SYSTEM FOR ELECTRONIC CHART DISPLAY AND INFORMATION SYSTEM AND SETUP METHOD OF MONITOR

BACKGROUND

Technical Field

The disclosure relates to a system and a method, and in particular to an adjusting system and a setup method of monitor for Electronic Chart Display and Information System (ECDIS).

Description of Related Art

Electronic Chart Display and Information System (ECDIS) has a wide range of applications, which covers, for example, ship traffic management, search and rescue command, port management, marine pollution management, water diversion business, fishery management, and ocean surveying and mapping. Navigators may use ECDIS together with global positioning systems and other technologies to plan safe channels, avoid dangerous sea areas, and improve navigation safety. ECDIS integrates disciplines such as navigation technology, computer application technology, ocean surveying and mapping technology, graphics and image processing technology, and modern communication technology, and is a technological revolution in the field of navigation.

In ECDIS, although clear specifications are given for multiple display colors of nautical charts, in actual applications, displays installed on ships may have color differences due to different brands, different manufacturing technologies, different specifications, and even different setting environments. All the variables make it difficult for various monitors to have consistent and unified standards for display.

SUMMARY

The disclosure provides an adjusting system and a setup method of monitor for Electronic Chart Display and Information System (ECDIS), which can adjust a monitor with consistent display characteristics and the characteristics are in compliance with standards specified by ECDIS.

The setup method of monitor of the disclosure is applied to a monitor of Electronic Chart Display and Information System. The setup method of monitor includes the following. A testing mode is selected from a day mode, a dusk mode, and a night mode, and a color setting corresponding to the testing mode is obtained. The monitor is controlled to display a first color according to the color setting. A brightness difference between the first color displayed by the monitor and a target color is measured and calculated, and the color setting of the monitor is adjusted accordingly until the brightness difference meets a brightness difference condition. A contrast difference between the first color displayed by the monitor and the target color is measured and calculated, and the color setting of the monitor is adjusted accordingly until the contrast difference meets a contrast difference condition.

The adjusting system for Electronic Chart Display and Information System of the disclosure includes a monitor, a color generator, a color analyzer, and a host. The color generator is coupled to the monitor and used to control a backlight setting and a color setting of the monitor. The color analyzer is used to measure and analyze a brightness and a contrast displayed by the monitor. The host is coupled to the color generator and the color analyzer. The host is used to perform the following. A testing mode is selected from a day mode, a dusk mode, and a night mode, and a color setting corresponding to the testing mode is obtained. The monitor is controlled by the color generator to display a first color according to the color setting. A brightness difference between the first color displayed by the monitor and a target color is measured and calculated by the color analyzer, and the color setting of the monitor is adjusted accordingly until the brightness difference meets a brightness difference condition. A contrast difference between the first color displayed by the monitor and the target color is measured and calculated by the color analyzer, and the color setting of the monitor is adjusted accordingly until the contrast difference meets a contrast difference condition.

Based on the above, the disclosure provides the adjusting system and the setup method of monitor for Electronic Chart Display and Information System. By first adjusting the brightness difference and then adjusting the contrast difference, a monitor with consistent color standards can be achieved by adjustments.

DESCRIPTION OF THE EMBODIMENTS

Figure 1:
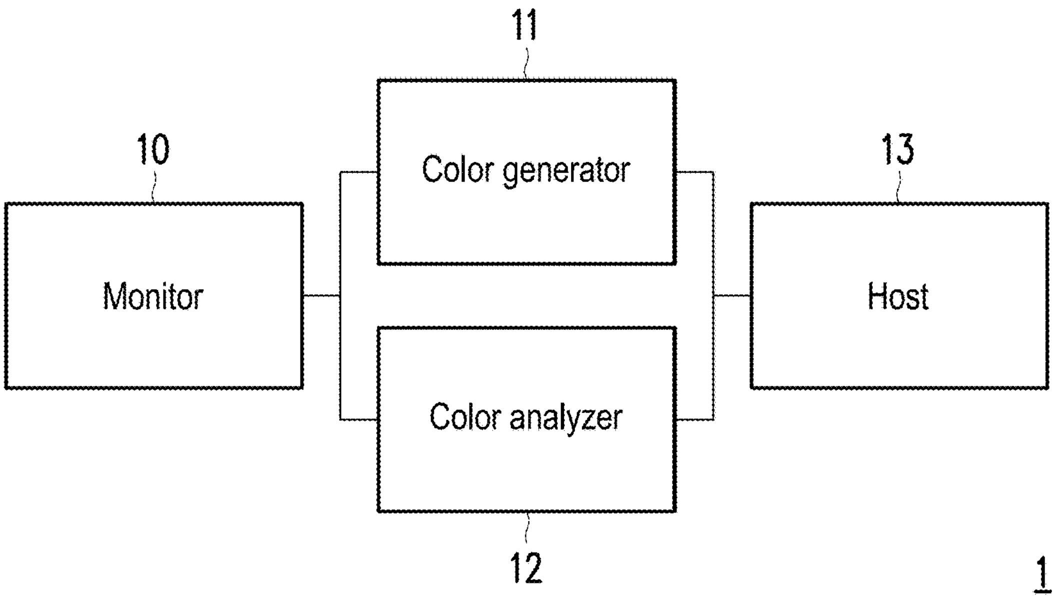
FIG. 1 is a block diagram of an adjusting system 1 for Electronic Chart Display and Information System (ECDIS) according to an embodiment of the disclosure.

FIG. 1 is a block diagram of the adjusting system 1 for Electronic Chart Display and Information System (ECDIS) according to an embodiment of the disclosure. The adjusting system may be used to adjust any one of monitors of different manufacturers and specifications in any environment. The monitor may be calibrated with a unified calibration standard through the adjusting system 1, so that the monitor adjusted through the adjusting system 1 has consistent display characteristics and the characteristics are all in compliance with standards specified by ECDIS.

Roughly speaking, the adjusting system 1 includes a monitor 10, a color generator 11, a color analyzer 12, and a host 13. The monitor 10 may be used for display. After the color generator 11 is coupled to the monitor 10, the host 13 may be used to control the color generator 11 and display a color setting on the monitor 10, and the host 13 may be used to control a backlight module of the monitor 10 to perform a backlight setting to control a color or screen displayed the monitor 10. The color analyzer 12 is coupled to the monitor 10 and may be used to measure and analyze a brightness and a contrast displayed by the monitor 10. The host 13 is coupled to the color generator 11 and the color analyzer 12. The host 13 may be used to control the color generator 11 and the color analyzer 12, thereby the monitor is controlled to display a first color according to the color setting. Also, a brightness difference and a contrast difference between the first color displayed by the monitor and a target color are measured and calculated, and the color setting of the monitor is adjusted accordingly until the brightness difference and the contrast difference meet a brightness difference condition and a contrast difference condition respectively.

Figure 2:
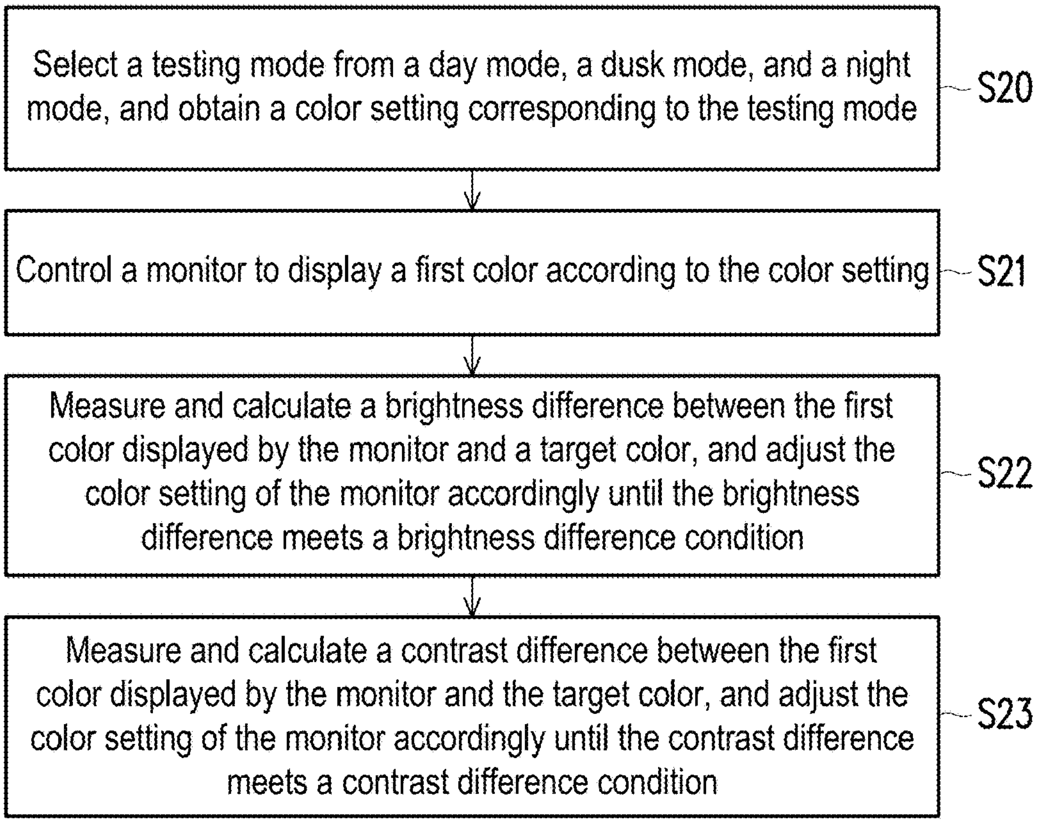
FIG. 2 is a flow chart of a setup method of monitor according to an embodiment of the disclosure.

FIG. 2 is a flow chart of a setup method of monitor according to an embodiment of the disclosure. The setup method of monitor in FIG. 2 may be performed through the adjusting system in FIG. 1. Specifically, the setup method of monitor in FIG. 2 includes Steps S20 to S23. In Step S20, a testing mode selected from a day mode, a dusk mode, and a night mode is used to obtain a color setting corresponding to the testing mode. In Step S21, the monitor is controlled to display the first color according to the color setting. In Step S22, the brightness difference between the first color displayed by the monitor and the target color is measured and calculated, and the color setting of the monitor is adjusted accordingly until the brightness difference meets the brightness difference condition. In Step S23, the contrast difference between the first color displayed by the monitor and the target color is measured and calculated, and the color setting of the monitor is adjusted accordingly until the contrast difference meets the contrast difference condition.

In some embodiments, in Step S20, the multiple modes specified by ECDIS include the day mode, the dusk mode, and the night mode, and the host 13 may select the testing mode from the multiple modes specified by ECDIS. For example, in order to ensure that each testing monitor may consistently be in compliance with the standards specified by ECDIS in any one of the testing modes selected from the day mode, the dusk mode, and the night mode, any testing mode of the disclosure is performed in a dark room.

In some embodiments, in Step S21, the host 13 may provide the color setting corresponding to the testing mode to the color generator 11, so that the color generator 11 controls the monitor 10 to display the first color according to the color setting, so as to adjust the first color displayed by the monitor 10 in subsequent steps. In some embodiments, ECDIS may make specifications for up to 63 colors, such as black, white, red, blue, and green, to specify color space values of the monitor 10 when displaying the colors. The adjusting system 1 may adjust the color setting of the monitor 10 when displaying all colors specified by ECDIS, or even more colors (for example, 67 colors), so that the display color of the monitor 10 is in compliance with the ECDIS specifications.

In some embodiments, in Step S22, the color analyzer 12 may measure the first color displayed by the monitor 10 and calculate the brightness difference between the first color displayed by the monitor 10 and the target color, so that the host 13 may adjust the color setting of the monitor 10 accordingly, and provide the adjusted color setting to the color generator 11 for display until the brightness difference between the first color displayed by the monitor 10 and the target color meets the brightness difference condition. In detail, as mentioned in the above paragraph regarding Step S21, the adjusting system 1 adjusts multiple colors displayed by the monitor 10. For example, the adjusting system 1 may adjust multiple colors sequentially according to a preset sequence. The adjusting system 1 may, for example, adjust white or white balance first, and then adjust other colors according to the adjusted white balance setting after completing the white balance adjustment. When the host 13 adjusts the first color displayed by the monitor 10, the host 13 may first compare the brightness difference between the first color and the target color corresponding to the first color to make adjustments until the brightness difference between the two colors meets the brightness difference condition. For example, the host 13 may adjust one of the three primary colors displayed by the monitor 10 to adjust the brightness difference between the first color and the target color. In some embodiments, the ECDIS specification requires that the brightness difference between the first color and the target color to be within 20%, and the adjusting system 1 may adjust the brightness difference to any value within 20% according to system requirements (for example, 6%) to adjust the brightness difference of the monitor 10.

In some embodiments, in Step S23, after the brightness difference meets the brightness difference condition, the adjusting system 1 then make adjustments directed to the contrast difference condition, so that the contrast difference between the first color displayed by the monitor 10 and the target color meets the contrast difference condition. Similar to the adjustment directed to the brightness difference in Step S22, the host 13 may also adjust one of the three primary colors displayed by the monitor 10 to adjust the contrast difference between the first color and the target color. In some embodiments, the ECDIS specification requires that the contrast difference between the first color and the target color to be within 20%, and the adjusting system 1 may adjust the contrast difference to any value within 20% according to system requirements (for example, preferably 8%) to adjust the contrast difference of the monitor 10.

After Steps S20 to S23 are performed, the adjusting system 1 may repeatedly perform the setup method of monitor in FIG. 2 to adjust a next color displayed by the monitor 10, until the adjusting system 1 completes adjustments of all target colors to the monitor 10.

Figure 3:
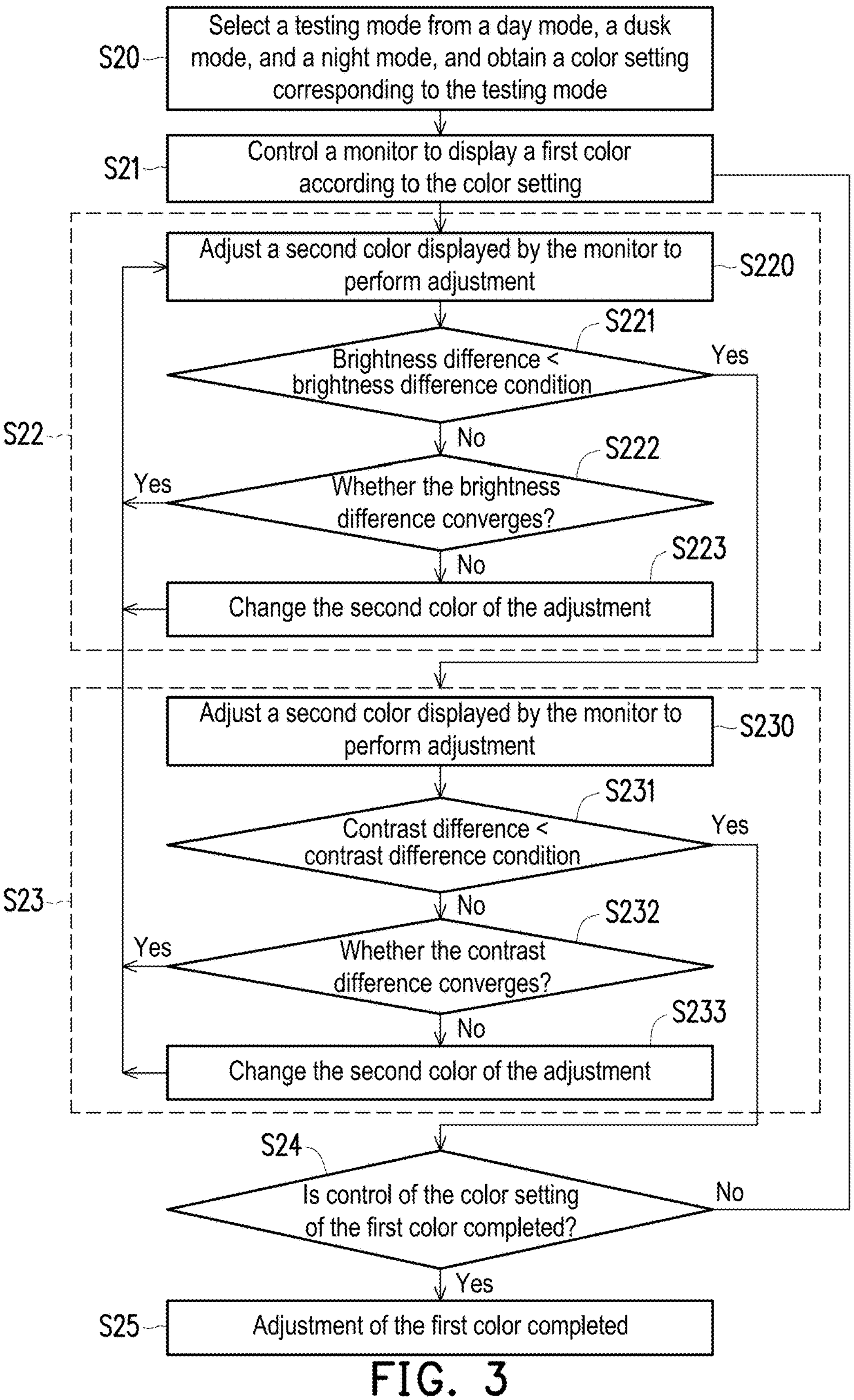
FIG. 3 is a flow chart of the setup method of monitor according to an embodiment of the disclosure.

FIG. 3 is a flow chart of the setup method of monitor according to an embodiment 1 of the disclosure. The setup method of monitor in FIG. 3 may be performed through the adjusting system in FIG. 1. In detail, the setup method of monitor in FIG. 3 is similar to the setup method of monitor in FIG. 2. The difference between the two embodiments is that the setup method of monitor in FIG. 3 includes more detailed operation steps.

In some embodiments, in Step S20, the multiple modes specified by ECDIS include the day mode, the dusk mode, and the night mode, and the host 13 may select the testing mode from the multiple modes specified by ECDIS. As mentioned before, the monitor is also tested in any testing mode in a completely dark environment.

In some embodiments, in Step S21, the host 13 may provide the color setting corresponding to the testing mode to the color generator 11, so that the color generator 11 controls the monitor 10 to display the first color according to the color setting, so as to adjust the first color displayed by the monitor 10 in subsequent steps. In some embodiments, ECDIS may make specifications for up to 63 colors, such as black, white, red, blue, and green, to specify the color space values of the monitor 10 when displaying the colors. The adjusting system 1 may adjust the color setting of the monitor 10 when displaying all colors specified by ECDIS, or even more colors (for example, 67 colors), so that the display color of the monitor 10 is in compliance with the ECDIS specifications.

On the other hand, when the host 13 controls the monitor 10 to display the first color according to the color setting, the color setting may be, for example, a color range. The host 13 may select an initial color setting value directed to the color range in the color setting to perform adjustment to the first color. For example, when the host 13 adjusts the white balance setting of the monitor 10, different modes may have different brightness ranges. A corresponding white balance color range in the day mode may be, for example, of 30% to 50% backlight brightness. A corresponding white balance color range in the dusk mode may be, for example, of 10% to 30% backlight brightness. A corresponding white balance color range in the night mode may be, for example, of 2% to 10% backlight brightness. Taking the day mode as an example, in the adjustment process of the host 13 controlling the monitor 10 to display white according to the color range, for example, the operation may be, the backlight brightness is first set to 30%, and then the white setting of the monitor 10 under the backlight brightness is adjusted in subsequent steps.

In some embodiments, Step S22 includes Steps S220 to S223. In Step S220, the host 13 may adjust a second color displayed by the monitor 10, thereby the first color displayed by the monitor 10 is adjusted. Specifically, the monitor 10 displays the first color by emitting the three primary colors and adjusting the intensity settings of the colors. Therefore, when the host 13 adjusts the first color displayed by the monitor 10, the adjusting operation may be, for example, adjusting one of the three primary colors, that is, adjusting one of red, green, and blue in order to adjust the first color displayed by the monitor 10. Therefore, it can be understood in a way that the first color is formed and presented by red, green and blue, wherein one or two of the red, the green and the blue of the first color is to be adjusted so as to form the second color. In some embodiments, the second color adjusted by the host 13 and the first color displayed by the monitor 10 may be the same or different color. For example, in a case of the first color being white, the host 13 may adjust the white color displayed by the monitor 10 by adjusting one of red, green, and blue. Alternatively, for example, in a case of the first color being red, the host 13 may certainly adjust the red color displayed by the monitor 10 by adjusting red. Certainly, according to the principle of the complementary characteristics of the three primary colors, the host 13 may certainly adjust the red color displayed by the monitor 10 by adjusting blue or green (detailed operations may, for example, refer to the relevant description in paragraph 0025 to make the content of this paragraph more comprehensible).

In some embodiments, in Step S221, the host 13 may analyze the first color displayed by the monitor 10 through the color analyzer 12, and determine the brightness difference between the first color and the target color corresponding to the first color. When the host 13 determines that the brightness difference is less than the brightness difference condition specified by ECDIS, the host 13 may leave Step S22 and enter Step S23, that is, enter the adjustment of the contrast difference. When the host 13 determines that the brightness difference is greater than or equal to the brightness difference condition specified by ECDIS, the host 13 enters Step S222 and continues to adjust the brightness difference.

In some embodiments, in Step S222, when the host 13 determines that the brightness difference does not meet the brightness difference condition, the host 13 may further determine whether the brightness difference converges. Specifically, in Step S220, when adjusting the second color displayed by the monitor 10, the host 13 may adjust the second color at least twice to find out whether a convergence direction of the brightness difference of the first color is correct when adjusting the second color, and continue to make subsequent adjustments of the second color according to the convergence direction. (In the description, the meaning of "the host 13 may adjust the second color at least twice" is as follows. After the second color is adjusted in a first and time and a second time (herein, adjustment refers to selecting one of the three primary colors as the second color to be adjusted and adjust the brightness of the second color; or, the complementary characteristics of the three primary colors are used to adjust the other two colors besides the selected second color among the three primary colors, by adjusting the other two unselected colors among the three primary colors, the operation of adjusting the second color is implemented), the host 13 evaluates the adjustment results of the second color in the first time and the second time to determine which adjustment result may make the screen displayed by the monitor 10 closer to the brightness difference condition specified by ECDIS for the first color. For example, the host 13 may, for example, increase the brightness of the second color in the second adjustment. If the host 13 determines that the second adjustment result is better than the first adjustment result, then the convergence direction of the brightness difference of the first color occurs when the brightness of the second color increases. Therefore, in the adjustment in Step S22, the operation is done by brightening the second color. In contrast, if the first adjustment result is better than the second adjustment result, then the convergence direction of the brightness difference of the first color occurs when the brightness of the second color decreases. Therefore, in the adjustment in Step S22, the operation is done by darkening the second color.) Therefore, when proceeding to Step S222, when the host 13 adjusts the second color according to the convergence direction, if it is observed that the brightness difference between the first color and the target color is reduced, then Step S220 may be returned to, and the same second color is continuously used to adjust the first color displayed by the monitor. In contrast, when the host 13 adjusts the second color according to the convergence direction, if it is observed that the brightness difference between the first color and the target color cannot make the brightness difference converge, then the host 13 may enter Step S223, change the second color to another color, for example, one of the other two of the three primary colors, and return to Step S220 to make adjustments according to the changed second color. That is to say, when the adjustment of the second color cannot reduce the brightness difference between the first color displayed by the monitor 10 and the target color, then in Step S23, the second color to be adjusted may be changed to a third color to be adjusted. If a result of adjusting the third color is closer to the brightness difference condition specified by ECDIS, then it means that the second color after adjusting the three primary colors is a correct adjustment. In other words, the convergence direction of the brightness difference is correct. Therefore, in Step S23, the operation may be proceeded by adjusting the third color.

In some embodiments, after adjusting the third color to a specific extent, the adjustment of the third color cannot reduce the brightness difference between the first color displayed by the monitor 10 and the target color. At this time, the host 13 may repeat Step S223, that is, after changing the third color to be adjusted, the adjustment continues. For example, the host 13 may select a fourth color not yet adjusted among the three primary colors for adjustment. Alternatively, the host 13 may reselect the previously adjusted second color. The reason is that, although the second color was used to reduce the brightness difference between the first color displayed by the monitor 10 and the target color in the previous adjustment, after the adjustment of the third color, the overall color space may also be changed due to the adjustment of the third color. Therefore, there may be a second adjustment for the second color to recheck whether the adjustment of the second color may make closer to the brightness difference condition specified by ECDIS. If it is confirmed that the adjustment of the second color cannot reduce the brightness difference between the first color displayed by the monitor 10 and the target color, then the host 13 may select the fourth color not yet adjusted among the three primary colors for adjustment. (It should be noted that, the second color, the third color, and the fourth color here generally refer to any color of the three primary colors RGB).

In some embodiments, the cycle in Step S22 continues until the brightness difference between the first color (FIG. 2) or the second color (formed by modifying the three primary colors of the first color) and the target color meets the brightness difference condition, and then Step S23 is entered.

In some embodiments, in Step S23, Step S230 is first performed to adjust the first color displayed by the monitor 10 by adjusting the second color. Similar to Step S220, the second color adjusted by the host 13 may be the same as or different from the first color displayed by the monitor 10. In some embodiments, a second color adjusted by the host 13 in Step S230 may be the same as or different from the second color adjusted by the host 13 in Step S220. Specifically, both the second colors adjusted by the host 13 in Steps S220 and S230 may be one of the three primary colors, and the two colors may be the same color. However, according to the principle of complementary characteristics of the three primary colors, even if the second colors adjusted by the host 13 in Steps S220 and S230 are different, the effect of adjusting the first color displayed by the monitor 10 can still be achieved. In other words, assuming that the three primary colors RGB of the first color in red are 200, 200, 200, when adjusting the three primary colors RGB of the second color, the operation may be first making a slight adjustment from one of the RGB (for example, red) to 210, 200, and 200. If the adjustment results in the contrast difference converging, then it means that the adjusted red 210, 200, and 200 is a correct adjustment, so the second color may be formed. Certainly, under this condition, the second color is very close to the target color (that is, close to the ECDIS specification).

In some embodiments, in Step S231, the host 13 may analyze the first color displayed by the monitor 10 through the color analyzer 12, and determine the contrast difference between the first color and the target color corresponding to the first color. When the host 13 determines that the contrast difference is less than the brightness difference condition specified by ECDIS, the host 13 may leave Step S23 and enter Step S24. When the host 13 determines that the contrast difference is greater than or equal to the contrast difference condition specified by ECDIS, the host 13 enters Step S232 and continues to adjust the contrast difference.

In some embodiments, in Step S232, when the host 13 determines that the contrast difference does not meet the contrast difference condition, the host 13 may further determine whether the contrast difference converges. Specifically, in Step S230, when adjusting the second color displayed by the monitor 10, the host 13 may adjust the second color at least twice to find out a convergence direction of the contrast difference of the first color when adjusting the second color, and continue to make subsequent adjustments of the second color according to the convergence direction. However, since the contrast and brightness of the image are related to each other, the adjustment to the contrast difference in Step S23 also affects the brightness difference. Therefore, any adjustment after Step S232 returns to Step S220 in Step S22 to first check the brightness difference in Step S22 and then return to Step S23 to check the contrast difference. More specifically, in Step S232, when the host 13 adjusts the second color according to the convergence direction, if it is observed that the contrast difference between the first color and the target color is reduced, then Step S220 may be returned to, and the same second color is continuously used to adjust the first color displayed by the monitor. In contrast, when the host 13 adjusts the second color according to the convergence direction, if it is observed that the contrast difference between the first color and the target color cannot make the contrast difference converge, then the host 13 may enter Step S233, change the second color to another color, for example, one of the other two of the three primary colors, and return to Step S220 to make adjustments according to the changed second color.

In some embodiments, Steps S22 and S23 continue until the brightness difference and contrast difference between the first color and the target color respectively meet the brightness difference condition and contrast difference condition, and then Step S24 is entered.

In Step S24, the host 13 determines whether the color setting for the first color has been completed. As previously described in the description of Step S21, the color setting may, for example, include a color range, and the host 13 may first select an initial color setting value from the color range to adjust the first color. More specifically, the adjusting system 1 may, for example, select color setting values in an order with an equal difference in the color range to adjust the first color. For example, the corresponding white balance color range in the day mode may be of 30% to 50% of backlight brightness. The host 13 may first select the initial color setting value of 30% of the backlight brightness to perform Steps S22 and S23, and adjust the color setting value successively with the equal difference of 5% to scan the range of 30% to 50% of the backlight brightness. Therefore, in Step S24, when the host 13 determines that the color setting for the first color is not yet completed, that is, when the color setting is not yet completed, the host 13 adjusts the color setting value to a next color setting value in the color range, and return to Step S21. In contrast, when the host 13 determines that the color setting for the first color is completed, the host 13 may enter Step S25, that is, the adjustment of the first color is completed.

In some embodiments, when the color setting may include a color range, Steps S21 to S24 are performed multiple times to obtain multiple adjusted color settings of the first color in the color range. In this case, the host 13 may select one of the multiple adjusted color settings as the setting value for the first color in the testing mode. For example, corresponding to the day mode, after completing multiple cycles of S21 to S24, the host 13 may obtain multiple white or white balance three primary color setting values corresponding to the backlight brightness being 30% to 50%. In this case, the host 13 may select the color setting with the largest adjustment range from the multiple three primary color setting values as the white setting value of the day mode. Also, in the subsequent color adjustment process, the white is used as the basis for color adjustment.

In summary, the setup method of monitor and the adjusting system of the disclosure can overcome variables of, for example, manufacturers, monitor specifications, and test environments, and provide a unified calibration standard in the monitor adjustment process, which enables the monitor adjusted by the setup method of monitor and the adjusting system to have consistent display characteristics, and the characteristics are in compliance with the standards specified by ECDIS.

What is claimed is:

1. A setup method of monitor applied to a monitor in an Electronic Chart Display and Information System (ECDIS), wherein the setup method of monitor comprises:

selecting a testing mode from a day mode, a dusk mode, and a night mode, and obtaining a color setting corresponding to the testing mode;

controlling the monitor to display a first color according to the color setting;

measuring and calculating a brightness difference between the first color displayed by the monitor and a target color, and adjusting the color setting of the monitor accordingly until the brightness difference meets a brightness difference condition;

measuring and calculating a contrast difference between the first color displayed by the monitor and the target color, and adjusting the color setting of the monitor accordingly until the contrast difference meets a contrast difference condition;

adjusting a backlight setting of the monitor so that a first backlight brightness displayed by the monitor meets a first white balance condition;

measuring and calculating the brightness difference and the contrast difference between the first color displayed by the monitor and the target color; and adjusting a first color setting value corresponding to the first color in the color setting to display the first color based on the backlight setting adjusted.

2. The setup method of monitor as claimed in claim 1, comprising:

adjusting the first color setting value corresponding to the first color in the color setting in an increasing or decreasing manner until the brightness difference between the first color displayed by the monitor and the target color stops converging;

comparing whether the brightness difference falls into a brightness difference range corresponding to the brightness difference condition to determine whether the brightness difference meets the brightness difference condition after determining that the brightness difference stops converging;

measuring and calculating the contrast difference between the first color displayed by the monitor and the target color in response to determining that the brightness difference meets the brightness difference condition; and adjusting a second color setting value in the color setting until the brightness difference meets the brightness difference condition in response to determining that the brightness difference does not meet the brightness difference condition.

3. The setup method of monitor as claimed in claim 1, wherein measuring and calculating the contrast difference between the first color displayed by the monitor and the target color comprises:

adjusting the first color setting value corresponding to the first color in the color setting to adjust the contrast difference between the first color displayed by the monitor and the target color based on the color setting adjusted and meeting the brightness difference condition;

re-confirming whether the brightness difference between the first color displayed by the monitor and the target color meets the brightness difference condition based on the color setting adjusted and meeting the contrast difference condition; and performing repeatedly a cycle of adjusting the brightness difference and the contrast difference of the first color until both the brightness difference condition and the contrast difference condition are met.

4. An adjusting system for an Electronic Chart Display and Information System (ECDIS), comprising:

a monitor;

a color generator, coupled to the monitor, configured to control a backlight setting and a color setting of the monitor;

a color analyzer, configured to measure and analyze a brightness and a contrast displayed by the monitor; and a host, coupled to the color generator and the color analyzer, wherein the host comprises a processor configured to:

select a testing mode from a day mode, a dusk mode, and a night mode, and obtain a color setting corresponding to the testing mode;

control, by the color generator, the monitor to display a first color according to the color setting;

measure and calculate, by the color analyzer, a brightness difference between the first color displayed by the monitor and a target color, and adjust the color setting of the monitor accordingly until the brightness difference meets a brightness difference condition; and measure and calculate, by the color analyzer, a contrast difference between the first color displayed by the monitor and the target color, and adjust the color setting of the monitor accordingly until the contrast difference meets a contrast difference condition.

5. The adjusting system as claimed in claim 4, wherein the host is further configured to:

adjust, by the color generator, a backlight setting of the monitor so that a first backlight brightness displayed by the monitor meets a first white balance condition; and measure and calculate, by the color analyzer, the brightness difference and the contrast difference between the first color displayed by the monitor and the target color, wherein the host is further configured to:

adjust, by the color generator, a first color setting value corresponding to the first color in the color setting to display the first color based on the backlight setting adjusted.

6. The adjusting system as claimed in claim 4, wherein the host is further configured to perform the following to adjust the color setting of the monitor until the brightness difference meets the brightness difference condition:

adjust, by the color generator, a first color setting value corresponding to the first color in the color setting in an increasing or decreasing manner until the brightness difference between the first color displayed by the monitor and the target color stops converging.

7. The adjusting system as claimed in claim 6, wherein the brightness difference condition is a brightness difference range, and the host is further configured to:

compare whether the brightness difference falls into a brightness difference range to determine whether the brightness difference meets the brightness difference condition after determining that the brightness difference stops converging.

8. The adjusting system as claimed in claim 7, wherein the host is further configured to:

measure and calculate, by the color analyzer, the contrast difference between the first color displayed by the monitor and the target color in response to determining that the brightness difference meets the brightness difference condition; and adjust, by the color generator, a second color setting value in the color setting until the brightness difference meets the brightness difference condition in response to determining that the brightness difference does not meet the brightness difference condition.

9. The adjusting system as claimed in claim 4, wherein the host is further configured to:

adjust, by the color generator, a first color setting value corresponding to the first color in the color setting to adjust the contrast difference between the first color displayed by the monitor and the target color based on the color setting adjusted and meeting the brightness difference condition;

control the color generator and the color analyzer to re-confirm whether the brightness difference between the first color displayed by the monitor and the target color meets the brightness difference condition based on the color setting adjusted and meeting the contrast difference condition; and perform repeatedly a cycle of adjusting the brightness difference and the contrast difference of the first color until both the brightness difference condition and the contrast difference condition are met.

* * * * *